US008862515B2

(12) United States Patent
Pedlow et al.

(10) Patent No.: US 8,862,515 B2
(45) Date of Patent: Oct. 14, 2014

(54) GEOGRAPHIC INTERNET ASSET FILTERING FOR INTERNET VIDEO CLIENT

(75) Inventors: Leo Pedlow, Ramona, CA (US); Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 937 days.

(21) Appl. No.: 12/782,094

(22) Filed: May 18, 2010

(65) Prior Publication Data

US 2011/0277005 A1   Nov. 10, 2011

Related U.S. Application Data

(60) Provisional application No. 61/330,993, filed on May 4, 2010, provisional application No. 61/331,092, filed on May 4, 2010.

(51) Int. Cl.
*G06F 21/00* (2013.01)
*G06Q 30/02* (2012.01)

(52) U.S. Cl.
CPC .................................. *G06Q 30/0205* (2013.01)
USPC .......................................................... 705/51

(58) Field of Classification Search
CPC ................................................ G06Q 30/0205
USPC .......................................................... 705/51
See application file for complete search history.

(56) References Cited

U.S. PATENT DOCUMENTS

| 6,374,402 | B1 | 4/2002 | Swchmeidler et al. |
| 7,380,280 | B2 | 5/2008 | De Jong |
| 7,454,622 | B2 | 11/2008 | Laidlaw et al. |
| 7,600,245 | B2 | 10/2009 | Steading et al. |
| 7,836,493 | B2 | 11/2010 | Xia et al. |

(Continued)

FOREIGN PATENT DOCUMENTS

| GB | 2435571 | 8/2007 |
| JP | 2008035108 | 2/2008 |

(Continued)

OTHER PUBLICATIONS

Ignacio Mas, Viktor Berggren, Rittwik Jana, John Murray, Christopher V. Rice; "IPTV Session Mobility". Jun. 12, 2009.

(Continued)

*Primary Examiner* — Charles C Agwumezie
(74) *Attorney, Agent, or Firm* — John L. Rogitz

(57) ABSTRACT

A device is enabled to display Internet TV by accessing a management server with a secret unique ID and receiving back from the server, assuming the ID is approved, a user token and a service list of content servers with knowledge of the user token. A user can select a content server which causes the device to upload its user token and in response receive a content list from the content server, from which content can be selected for display. Neither list may be modified by the device and the device can access only content on a content list. The service list may be tailored for the geographic location of the device.

17 Claims, 3 Drawing Sheets

(56) References Cited

U.S. PATENT DOCUMENTS

| | | |
|---|---|---|
| 2001/0054157 A1* | 12/2001 | Fukumoto .................... 713/201 |
| 2003/0078842 A1 | 4/2003 | Scholten et al. |
| 2004/0008972 A1 | 1/2004 | Haken |
| 2005/0086683 A1 | 4/2005 | Meyerson |
| 2006/0212531 A1 | 9/2006 | Kikkawa et al. |
| 2007/0061858 A1 | 3/2007 | Ura |
| 2007/0256118 A1 | 11/2007 | Nomura et al. |
| 2008/0244658 A1 | 10/2008 | Chen |
| 2009/0007187 A1 | 1/2009 | Koul |
| 2009/0049480 A1 | 2/2009 | Wang et al. |
| 2009/0113502 A1 | 4/2009 | Chen |
| 2009/0158330 A1 | 6/2009 | Song et al. |
| 2009/0164786 A1 | 6/2009 | Sekimoto et al. |
| 2009/0180614 A1 | 7/2009 | Rajagopal et al. |
| 2009/0181641 A1* | 7/2009 | Fiatal ........................... 455/406 |
| 2009/0210552 A1 | 8/2009 | Ozugur et al. |
| 2009/0222874 A1 | 9/2009 | White et al. |
| 2009/0271826 A1 | 10/2009 | Lee et al. |
| 2009/0282236 A1 | 11/2009 | Hallenst l et al. |
| 2009/0293078 A1 | 11/2009 | Pirani et al. |
| 2010/0042735 A1* | 2/2010 | Blinn et al. .................... 709/229 |
| 2010/0080163 A1* | 4/2010 | Krishnamoorthi et al. ... 370/312 |

FOREIGN PATENT DOCUMENTS

| | | |
|---|---|---|
| WO | 2009022869 | 2/2009 |
| WO | 2009052650 | 4/2009 |
| WO | 2009057965 | 5/2009 |
| WO | 2010023662 | 4/2010 |

OTHER PUBLICATIONS

True Xiong, Charels David McCoy, Viral Mehta, Leo Pedlow, Aran Sadja, "Enablement of Premium Content for Internet Video Client" related U.S. Appl. No. 12/844,312, final office action dated Apr. 25, 2013.

CATR/MII, "IPTV Security Requirements", International Telecommunication Union, FG IPTV-ID-0051 Jul. 10-14, 2006.

UTStarcom, "Architecture Requirement for IPTV Authentications", International Telecommunication Union, FGIPTV-ID-0073, Jul. 10-14, 2006.

* cited by examiner

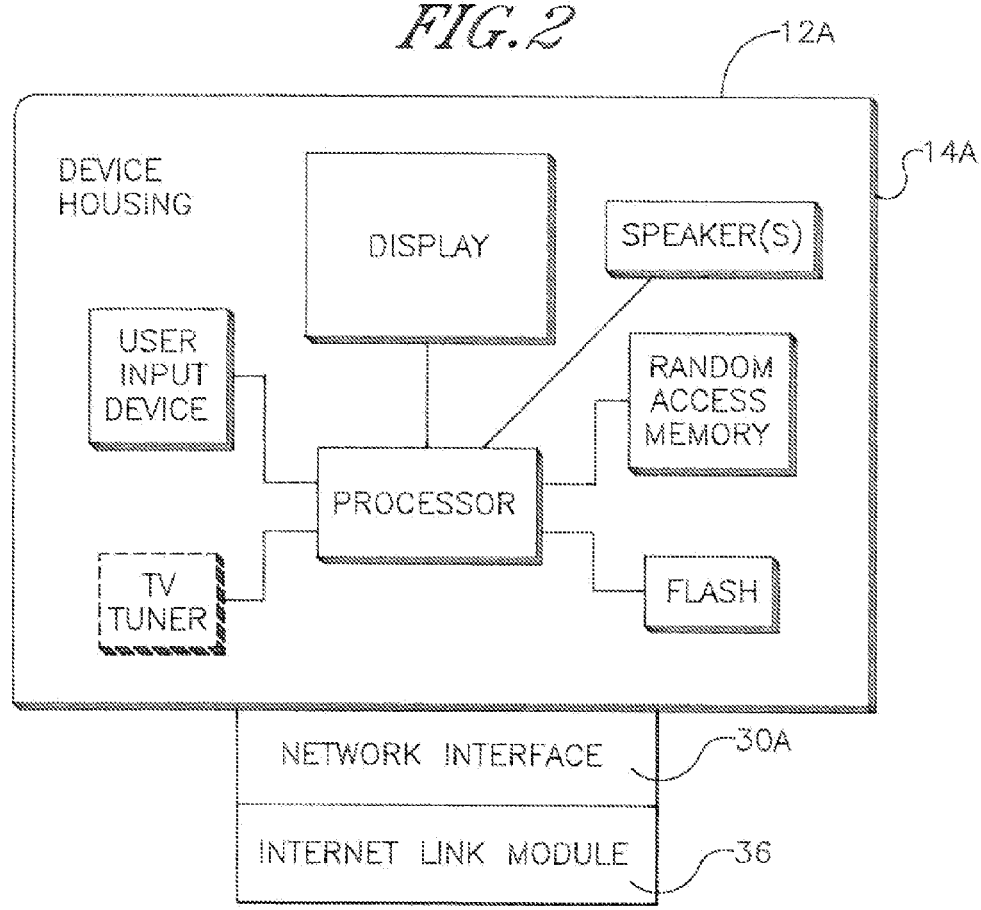
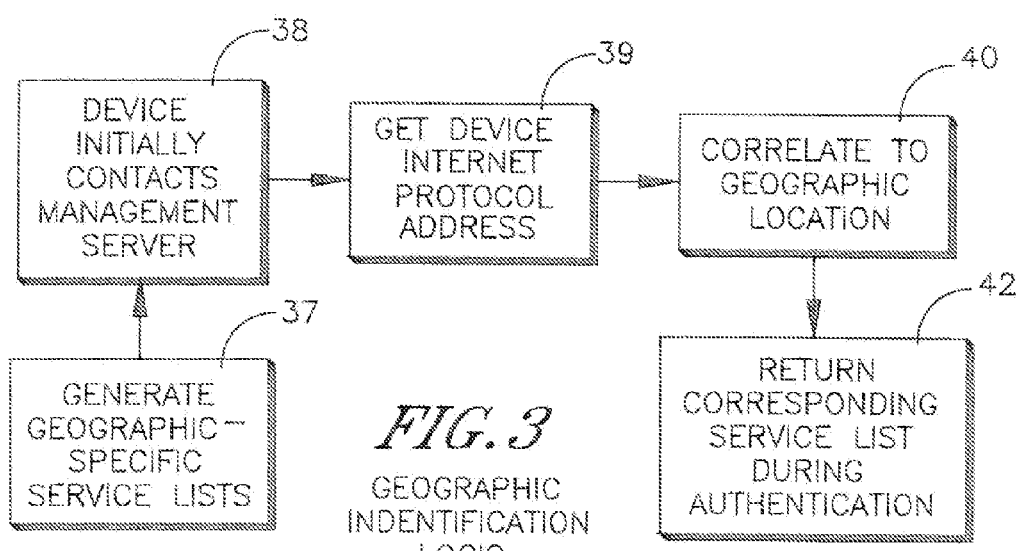

SERVER AUTHENTICATION

SUBSEQUENT AUTHORIZATION

GEOGRAPHIC INTERNET ASSET FILTERING FOR INTERNET VIDEO CLIENT

This application claims priority from U.S. provisional applications Nos. 61/330,993 and 61/331,092, both filed May 4, 2010.

FIELD OF THE INVENTION

The present application relates generally to geographic Internet asset filtering for Internet video clients including but not limited to TVs.

BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet. And, much Internet content that is appropriate for some geographic locations is not appropriate for others, but unlike TV content, cannot be closely managed.

SUMMARY OF THE INVENTION

Accordingly, a consumer electronic (CE) device includes a housing, a display on the housing, a network interface, and a processor in the housing controlling the display and communicating with the Internet through the network interface. The processor executes logic that includes contacting a management server and providing an Internet Protocol (IP) address to, the management server. The IP address is associated with a geographic location associated with the CE device. The processor receives from the management server at least one geographically-tailored service list which contains only content server addresses that have been approved for access in the geographic region indicated by the IP address of the CE device. The service list is presented on the display, and responsive to a user selection of an entry on the service list, the processor accesses a content server associated with the entry.

If desired, the processor permits the user no access to Internet sites other than to the management server and content servers on the service list.

In another aspect, a management server includes a network interface and a processor communicating with the Internet through the network interface. The processor executing logic which include storing plural geographic-specific service lists. Each service list contains a list of network addresses of content servers approved for access by CE devices in a respective geographic region. Thus, a first address of a first content server for a first geographic location is on a first service list but not on a second service list and a second address of a second content server for a second geographic location is on the second service list but not the first service list. The processor obtains a geographic indicator from a CE device contacting the management server, correlates the indicator to a geographic region, and returns the first service list to the CE device responsive to a determination that the CE device is in a first geographic region. In contrast, the processor returns the second service list to the CE device responsive to a determination that the CE device is in a second geographic region.

In another aspect, a method includes receiving, from a client audio-video presentation device to a management server, an identification indicating a geographic location of the device. The method also includes, responsive to a determination that the device is in a first geographic location, returning, from the management server to the device, a first list of content servers at which the device may access content. Responsive to a determination that the device is in a second geographic location, the method includes returning, from the management server to the device, a second list of content servers at which the device may access content.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a block diagram of another example system in accordance with present principles;

FIG. 3 is a flow chart of example geographic identification logic;

DETAILED DESCRIPTION OF THE PREFERRED EMBODIMENT

Figure 1:
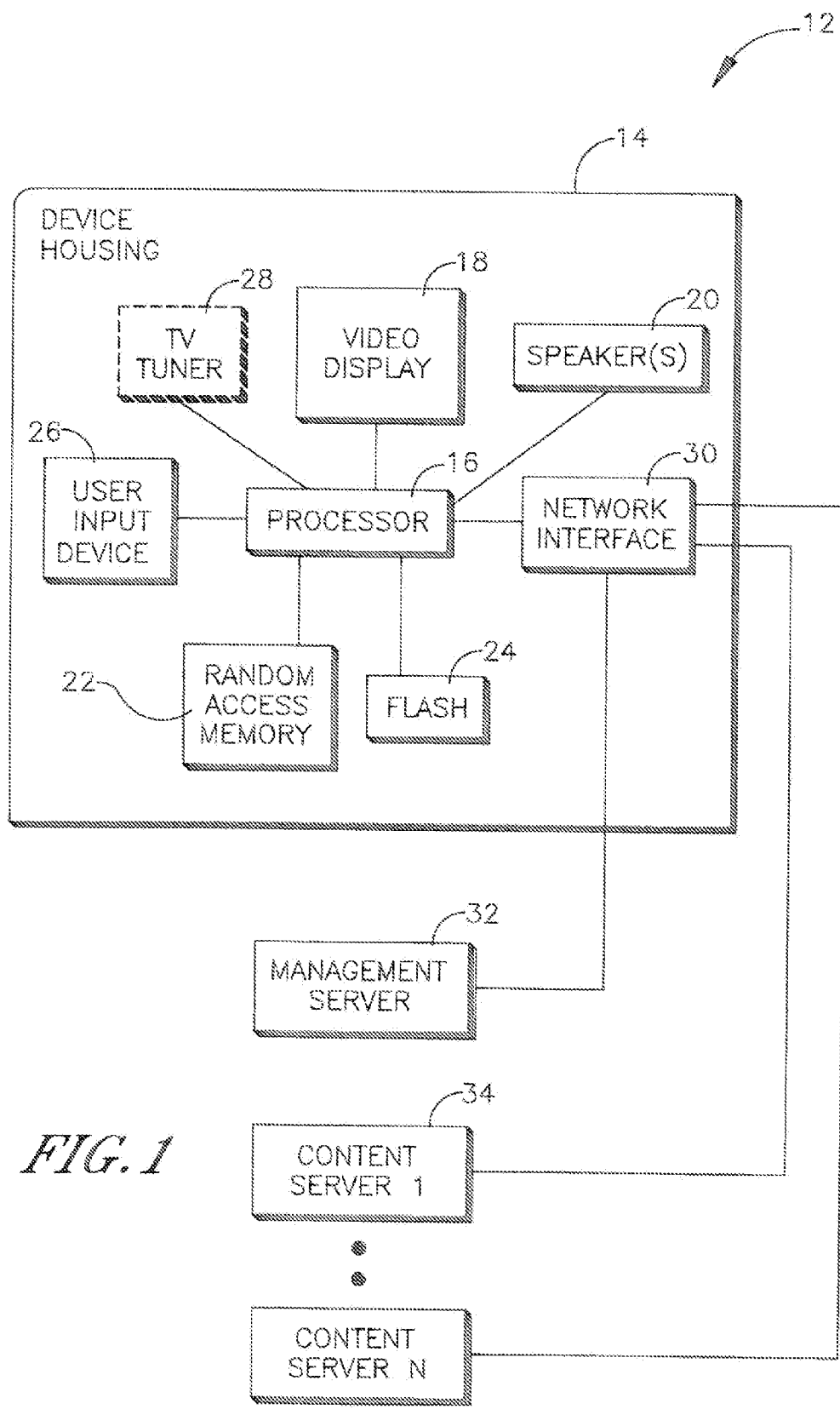
FIG. 1 is a block diagram of an example system in accordance with present principles.

Referring initially to FIG. 1, a consumer electronics (CE) device 12 (also referred to herein as "player" and "IPTV client") such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers.

To undertake present principles, the processor 16 may access one or more computer readable storage media such as but not limited to RAM-based storage 22 (e.g., a chip implementing dynamic random access memory (DRAM)) or flash memory 24. Among other things, in example non-limiting embodiments video thumbnails may be stored on the RAM 22 while the below-described service list and tokens as well as user interface icons may be stored on the flash 24. Software code implementing present logic executable by the CE device 12 may also be stored on one of the memories shown to undertake present principles.

The processor 16 can receive user input signals from various input devices 26, including a remote control device, a point and click device such as a mouse, a keypad, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. The servers 32, 34 have respective processors. It is to be understood in view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16.

FIG. 2 shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Now referring to FIG. 3, at block 37 geographic-specific service lists are generated and provided to the management server 32. As divulged further below, a service list contains a list of network addresses of approved content servers 34. The content servers 34 typically are affiliated with business partners of the entity associated with the management server 32. Recognizing that some content and/or content servers may be appropriate for a first geographic location but not for a second location, a business partner may provide the address ("A") of a first content server for the first geographic location and the address ("B") of a second content server for the second geographic location. In this example hypothetical, a first service list would include the address "A" but not "B" and vice-versa for a second service list, thereby tailoring the lists for the first and second geographic locations, respectively.

At block 38, when the CE device 12 initially contacts the management server 32, the server 32 moves to block 39 to obtain the Internet Protocol (IP) address of the CE device 12 or other suitable indicator of the geographic location of the CE device 12. The IP address of the CE device 12 is correlated to a geographic region at block 40 by, e.g., using a lookup of IP addresses and their corresponding locations. Note that the IP address obtained by the server 32 may be a proxy of a service provider and thus that the geographic region of the service provider is obtained at block 40, which for present purposes is a sufficiently close approximation of the geographic location of the CE device 12. Block 42 simply indicates that the service list or lists corresponding to the geographic location discovered at block 40 is returned as part of the authentication process in block 48 below.

Figure 4:
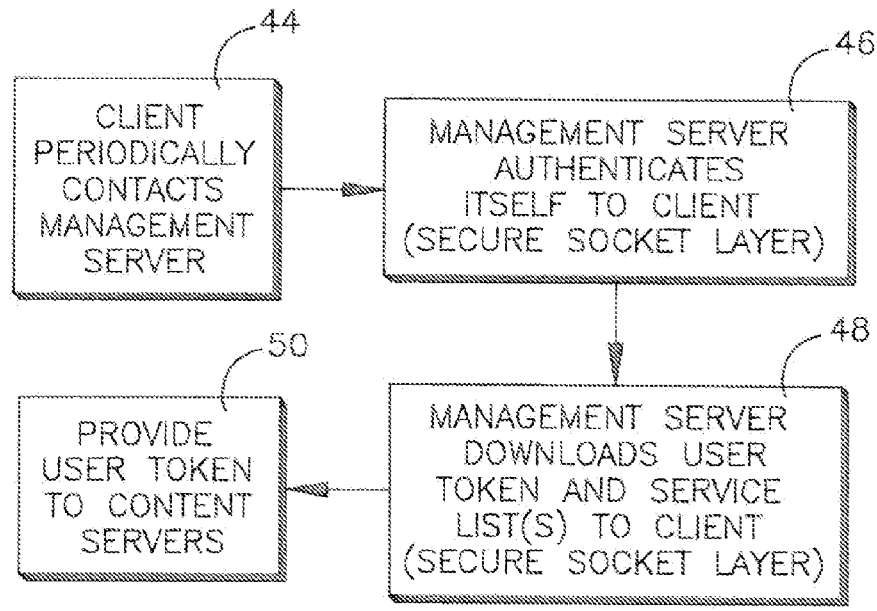
FIG. 4 is a flow chart of example authentication logic according to present principles.

Indeed and now referring to FIG. 4, at block 44 the CE device 12 periodically checks in with the management server 32. Proceeding to block 46, the management server 32 authenticates itself to the CE device 12 so that the CE device 12 knows that it is contacting the correct server and is not being spoofed. The authentication may be undertaken using, e.g., SSL certificates. The CE device 12 can then send to the server 32 a unique CE device ID in a SSL, without requiring key encryption of the processor 16. The CE device 12 may verify the server 32 using the public key of the certificate authority of the server certificate returned by the server 32.

Block 48 indicates that next in the logic flow, the management server 32 downloads to the CE device 12 a user token, also referred to herein as an access token or service token, along with one or more service lists each of which contains a list of network addresses of approved content servers 34. This may be done again using SSL. As described above, the service list or lists downloaded at block 48 are geographically correlated to the geographic location of the CE device 12 discovered in FIG. 3. The user token preferably has an expiration period after which it is no longer accepted by content servers during the authorization logic discussed below. The management server 32 provides the user token along with its expiration time to the content servers 34 for purposes to be shortly disclosed.

Figure 5:
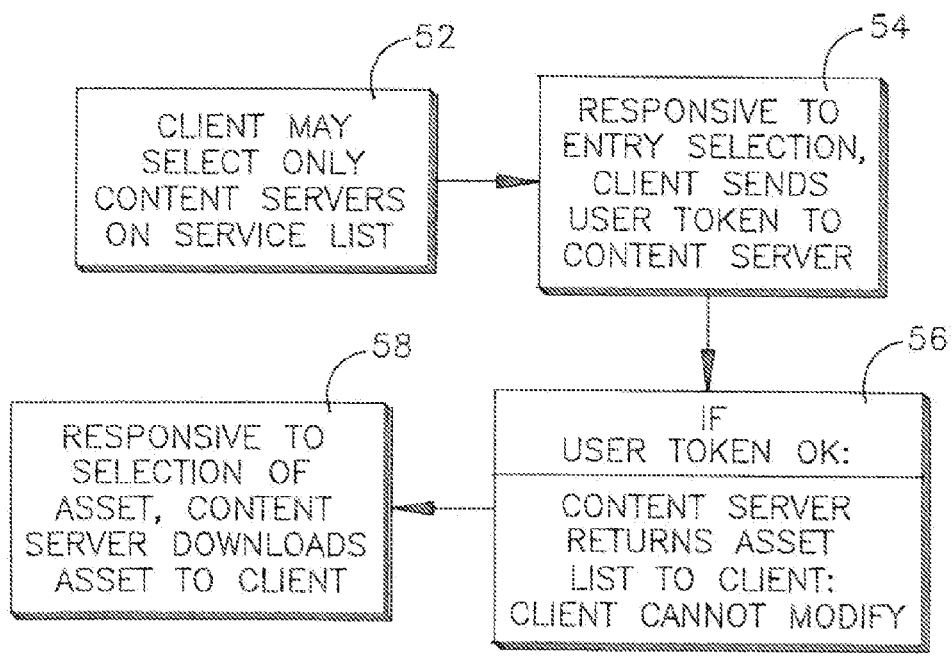
FIG. 5 is a flow chart of example authorization logic according to present principles.

The service list is typically presented by the processor 16 in a user interface (UI) presented on the display 18. The UI may simply present icons of service providers associated with the various approved content serves 34 whose network addresses can underlie the UT in the list. The UI may also present other content as desired such as the names of genres available at each content server, etc. In any case, a user of the CE device 12 may manipulate the input device 26 to select a member of the service list at block 50, which causes the processor 16 to upload, though the network interface 30, the user token to the selected content server 34 to enter the authorization logic of FIG. 5.

As discussed above, only content servers 34 on the closed and unmodifiable (except by the management server 32) service list(s) downloaded to the CE device 12 by the management server 32 can be selected by the user, as indicated at block 52. As new services (embodied by newly approved content servers 34) become available, they can be added to the service list(s) and, hence, made available across all platforms on the fly.

Recall that user tokens and their expiration times are provided by the management server to the content servers 34. Each content server 34 can then maintain a local database of active user tokens, removing each one at its respective expiration time. When a content server 34 receives a user token at block 54, it checks it against the local database of active tokens and if the user token is in the database, the logic moves to block 56 wherein the content server 34 returns a content list to the CE device 12. Thus, no further authentication is required between the CE device 12 and content server 34 beyond the provisioning of an active user token by the CE device 12. And, by virtue of the content server 34 appearing on the service list provided by the management server 32, the CE device 12 knows that it may trust the content server 34 without need for any further authentication on the part of the content server 34.

Essentially, a content list is a list of audio-video programs that the entity associated with the content server 34 has elected to make available to platforms in the Internet TV system. Like the service list, the content lists from the content servers 34 cannot be modified by the CE device 12.

Moving to block 58, the user may manipulate the input device 26 to select a program on the content list, which is then delivered, as by streaming, from the content server 34 to the CE device 12 for presentation on the display 18 and speakers 20.

Accordingly, once the CE device 12 is authenticated, the CE device 12 is delivered a geographically-tailored "service list" from the management server, i.e., a service list that contains only content server addresses that have been approved for access in the geographic region indicated by the IP address of the CE device 12. The CE device 12 is assumed to not be open, and preferably no tools are provided to allow modification of the list after it is delivered to the CE device 12. The list can be signed by the management server 32 and delivered in a unique session to a CE device 12 so that it is therefore not feasible for an eavesdropper to intercept and change or substitute the list externally. The service list is typically delivered in an encrypted channel using secure socket layer (SSL) or other secure means.

As mentioned above, the service list consists of a list of network addresses such as uniform resource locators (URLs) to service (content) providers, i.e., the content servers 34. The CE device 12 uses the URLs listed in the service list to obtain a content list of video or audio to play. The content list may also be delivered in an encrypted channel using secure socket layer (SSL) or other secure means, and preferably it is not possible for the client to modify the URLs in the content list.

If desired, the service list URLs and the content list URLs can have tags that identify the type of CE device 12. Alternatively, as part of the authentication process, the CE device 12 may be given a Service Token by the management server which can identify the device to the service provider.

It will be appreciated that the mere possession of a particular URL to a service provider and user token allows access to the content. This is a desirable simplification as the fulfillment URL is that which is delivered to the CE device 12. The fulfillment URL is delivered in a secure way. In any case, present principles provide a scalable option for granting access to content on the Internet. The definition of a right to access is agreed upon by the management systems and the service providers . . . and this is manifested by a fulfillment URL.

Content titles available for viewing by the user can be obtained from the selected content server through an appropriate HTML request. The response to this request is a list of asset records, with each record containing fields (metadata) pertaining to a particular content title. Since a common asset list structure is used for the delivery of a variety of different lists, e.g. content asset lists, bookmark lists, message lists, etc., some asset record fields are not applicable to a particular list context, not filled with data by the server and are ignored by the client.

Navigation to user-selected content is accomplished through any one of a variety of methods on a per-asset and in some cases, per-instance basis. The selection of which method to use may be entirely at the discretion of the service provider based upon their service implementation, business needs, etc. Navigation methods available include direct navigation, indirect navigation, navigation using discrete playlists, navigation using incremental or server-based playlists, navigation using client-side playlists, static asset association to a playlist and dynamic asset association with a playlist.

The simplest case is direct navigation to a URL. In this case, the asset record source field can carry the actual URL of the selected content. In the process of accessing the content through issuing an HTTP GET to the URL, there can be a series of intervening 302 REDIRECT responses issued by the URL target and these can be interpreted and followed by the IPTV client to ultimately access a deliverable resource.

The second navigation method is indirect navigation, using a pointer to the desired asset. For many content providers, the actual content URL is a non-static value that is dynamically changed and may be encoded with security and user/usage tracking information. As a result, the URL assigned to a particular piece of content may be different for different users as well as for successive asset list queries made by the same user. Additionally, the assigned URL may expire after a relatively short period and become unresolvable prior to the user navigating to the associated content. The use of the indirect navigation method is indicated to the client by omitting the source URL value in the asset record.

The indirect navigation schema can be implemented by the processor 16 using the content provider assigned asset ID value, contained in the asset record, as the sole persistent reference to a particular piece of content. Because the desired asset has no source value, the processor 16 knows that indirect navigation is to be used and issues an appropriate HTML request passing the asset ID value to the service provider. The URL that the provider wishes to have assigned to that asset selection instance may be determined by the CE device 12 through the response obtained from the content provider as a result of an appropriate HTML request. In turn, an HTTP GET request can be issued by the client to the received URL string and the resulting A/V stream is then routed to the IPTV video player subsystem for decoding and rendering on the attached television. The form of the response can be in the form of a playlist, containing at least one entry, in order to resolve the URL associated with the indicated asset.

The data structures and request syntax provides flexibility for the service provider in presenting content to the user. Content may be separated and presented grouped under a common context referred to as a category. Content can be alternatively accessed through the video guide in a graphical hierarchy using 'pipe' assets. The display order of content can be user selected through service provider defined sort selections under the options menu. Service providers can determine which, if any, of these features to use and the extent.

The definition of categories and their naming can be determined by each service provider. The scope of category definition may be limited to a single service provider, and each category definition may have two main components. The first component can be the text name to be displayed on the IPTV UI in the category list on-screen. The second component can be a category ID string, also defined by the service provider, indicating to the provider's hosting implementation a unique action that should be taken in association with the selection of displayed category text string by the user.

Pipe assets are a special type of navigable asset that can be included within the list of returned asset records in response to an appropriate request. Pipe assets can have a title and associated thumbnail, just as video assets have. The difference is that pipe assets typically have no associated source asset, but instead have specified category, option and list offset variables that are provided to the IPTV client instead. The CE device 12, in-turn, may immediately send a request to the service provider with the category, option and list offset values as were indicated in the pipe parameters in the asset record. By being able to control where the video guide focus moves to through a user selection of the pipe asset, the service provider can create a completely iconic navigation experience with the appearance of hierarchical categories and assets (subcategories), jump to beginning, end or any arbitrary point in a long list of assets, etc.

The definition of sorting options and the associated naming can be determined by each service provider. The scope of display order definition can be limited to a single service provider. Each sort definition may have two main components, namely, a text name to be displayed on the UI of the CE device 12 in a 'sort by' list on-screen and an option ID string, also defined by the service provider that indicates the action to be taken upon selection of an option.

Content selected by the viewer from the video guide display for playback can be communicated to the service provider (i.e., a content server 34) by the CE device 12 sending an HTTP GET request to the URL string associated in the metadata record for the desired asset. This URL string can be either contained directly within the asset metadata record or can be received as a result of an intervening request to the service provider when no asset URL is indicated in the asset metadata record (indirect navigation). The received A/V stream is routed to CE device 12 for decoding and rendering incrementally, whenever enough data to display each video frame is received. Content buffering can be optimized to reduce the selection to first video image latency.

To support the business needs of service providers, such as pre-roll, mid-roll, interstitial or post-roll advertising, the CE device 12 may support the concept of content linking or sequencing. The methods used, however, need not be based exclusively upon traditional client-executed playlists. Instead, the methods may support a 'server-based' or incremental playlist scheme, where the entire playlist can be maintained on the service provider's server and delivered incrementally to the CE device 12 in addition to the more traditional discrete playlist, where the entire playlist is delivered once, en masse to the client for execution.

The delivery of playlist data may be accomplished using either of two entirely different methods. The first method is a persistently associated context semaphore contained within an asset record wherein the asset type for items having a playlist permanently associated with the content is defined as type 'playlist'. This method defines that the source URL in the asset record forms the HTTP request for a playlist containing the requested asset rather than an HTTP request for the actual asset.

The second method can be supported only for those content records using an asset ID as the persistent reference to a specific piece of content i.e. those without a source URL. This method uses an asset request in conjunction with the asset ID of the desired content. The XML structure returned in response to the request contains a playlist with at least one, but in some non-limiting implementations not more than, twenty entries. The playlist format in this case can be identical to that of the playlist obtained through the use of a context semaphore. The only difference between this method and the context semaphore method is that in this second method, the service provider can choose at time of play whether a playlist should be associated with a content selection based upon whatever criteria it chooses.

A server-based (incremental) playlist can be realized through the same processes used to deliver a discrete playlist, as described. An incremental playlist is a playlist having one or more entries and that the entry is a link to another playlist. In one example implantation, only list chaining may be supported. If a link to another playlist is included in a playlist prior to the end of the list, execution of the list can jump to the referenced list and any linkage to the calling list lost. At the end of executing the referenced list, control will be returned to the video guide page, not the calling list.

In addition to supporting pre-roll, interstitial and post-roll advertising/promotion models, the incremental form of playlist allows the service provider the flexibility to offer 'channelized' content presentation, wherein all content contained in a particular row or category of the video guide is played in sequence. Additionally, it also supports any form of sequencing that the service provider may desire to implement so that once a user selects one piece of content, the player will continue to play other titles until stopped by the user. It is also conceivable that service providers may be interested in making this feature user configurable via the service provider-defined option menu. The selectable options defined by the service provider related to the playlist could include continuous play toggle on/off and random, genre, popularity, chronological, artist, etc. based play order.

To provide indication of playback of a particular piece of content to a service provider or another party that they have designated, like an ad agency, etc., the capability to support event notification may be implemented. The event notification function can be used for playback beacons, impression counting, advertising auditing or other processes. Event notification may consist of a list of events provided as part of the service provider's XML response to an appropriate request or an HTTP GET to a URL from an asset record having the type parameter set to 'playlist'. Each playlist event entry will contain a trigger point, defined as occurring when a specified amount of the content playload has been received and decoded, and an associated URL to interrogate upon the trigger criteria being met. The process of notification can be for the CE device 12 to issue an HTTP GET request to the particular URL associated with the triggering criteria. Any data received by the CE device 12 in response to the request can be discarded without evaluation. Once an event is consumed during the playback of a particular asset, it can be disabled from further use. Retriggering during the decoding session of a particular asset may not be supported. Additionally, the scope of an event may be limited to the playback of the content with which it was associated.

In addition to supporting playlists, attributes, defined by the service provider and associated with the identified asset, can be optionally included as directives to the CE device 12 during playback. These attributes may define a list of individual playback functions that are disallowed by the content provider for that asset. These functions may include fast forward, rewind, pause, etc. If the list is empty, then all playback modes can be allowed to be offered to the user by the CE device 12. The scope of an attribute can be limited to the playback of the content with which it was associated. Once playback of an asset is completed, all attributes may be reset. Attributes defined for one asset do not apply to subsequent assets unless those attributes are specifically reasserted for each asset.

Additional attributes are included to provide the option of having titles and other information that is displayed in association with playback of content uniquely reflecting the actual asset currently playing from the playlist. This gives service providers the ability to have titles with each asset in a playlist if that playlist, for example, is a sequence of items available from the video guide, yet display only a single selection-based title during a pre-roll inserted ad prior to the actual user-selected content.

While the particular GEOGRAPHIC INTERNET ASSET FILTERING FOR INTERNET VIDEO CLIENT is herein shown and described in detail, it is to be understood that the subject matter which is encompassed by the present invention is limited only by the claims.

What is claimed is:

1. Consumer electronic (CE) device comprising:

housing;

display on the housing;

network interface;

processor in the housing controlling the display and communicating with the Internet through the network interface;

the processor executing logic including:

contacting a management server;

providing an Internet Protocol (IP) address to the management server, the IP address being associated with a geographic location associated with the CE device;

receiving from the management server a user token and at least one geographically-tailored service list, the service list containing only content server addresses that have been approved for access in the geographic region indicated by the IP address of the CE device, the server addresses being uniform resource locators (URLs);

presenting the service list on the display; and responsive to a user selection of an entry on the service list, accessing a content server associated with the entry, wherein as part of the accessing of a content server the processor also provides the user token such that the CE device receives a content list of available content from the content server only responsive to the content server receiving the user token, checking the user token against a local database of active tokens, and responsive to the user token being in the database, the content server returns the content list to the CE device such that no further authentication is required between the CE device and content server beyond the provisioning of a valid user token by the CE device, and further wherein, responsive to a determination that the content server appears on the service list provided by the management server, the CE device trusts the content server without need for any further authentication on the part of the content server, wherein the logic controls the processor to permit the user no access to Internet sites other than to the management server and content servers on the service list.

2. The CE device of claim 1, wherein the CE device is a television.

3. The CE device of claim 1, wherein the CE device is a game player.

4. The CE device of claim 1, wherein the CE device is a video disk player.

5. The CE device of claim 1, wherein the CE device is a camera.

6. The CE device of claim 1, wherein the CE device is a digital clock radio.

7. The CE device of claim 1, wherein the CE device is a mobile telephone.

8. The CE device of claim 1, wherein the CE device is a personal digital assistant.

9. Management server comprising:
network interface;
processor communicating with the Internet through the network interface;
the processor executing logic including:
storing plural geographic-specific service lists, each service list containing a list of network addresses of content servers approved for access by CE devices in a respective geographic region, wherein a first address of a first content server for a first geographic location is on a first service list but not on a second service list and a second address of a second content server for a second geographic location is on the second service list but not the first service list;
obtaining a geographic indicator from a CE device contacting the management server;
correlating the indicator to a geographic region;
returning the first service list to the CE device responsive to a determination that the CE device is in a first geographic region and returning the second service list to the CE device responsive to a determination that the CE device is in a second geographic region;
providing to the content servers on the service lists a respective user token for each authorized user; and
returning to the CE device a user token associated therewith, wherein the CE device must present its user token to a content server and the content server must determine a match exists between the user token presented by the CE device and a token stored in a database associated with the content server prior to the content server providing content to the CE device.

10. The management server of claim 9, wherein the content servers are affiliated with business partners of an entity associated with the management server, the business partners providing geographic-filtered addresses to the management server for generation of the first and second service lists.

11. The management server of claim 9, wherein the geographic indicator is an Internet Protocol (IP) address of the CE device.

12. The management server of claim 9, wherein the correlating is done by using a lookup of IP addresses and their corresponding locations.

13. Method comprising:
receiving, from a client audio-video presentation device to a management server, an identification indicating a geographic location of the device;
responsive to a determination that the device is in a first geographic location, returning, from the management server to the device, a first list of content servers at which the device may access content along with a user token required to be presented by the audio-video presentation device to a content server to access content therefrom; and
responsive to a determination that the device is in a second geographic location, returning, from the management server to the device, a second list of content servers at which the device may access content, wherein the device is not able to access Internet servers not on the lists other than the management server, the first list being different from the second list in at least one respect.

14. The method of claim 13, wherein no billing or accounting information is required of the device to access content on any of the content servers.

15. The method of claim 13, wherein the content servers are affiliated with business partners of an entity associated with the management server, the method comprising received from the business partners geographic-filtered addresses for generation of the first and second service lists.

16. The method of claim 13, wherein the identifier is an Internet Protocol (IP) address of the device.

17. The method of claim 13, wherein comprising correlating the identification to a geographic region by using a lookup of identifications and their corresponding locations.

* * * * *